Nov. 16, 1926.     1,606,802
C. W. KURTZ ET AL
GLASS CUTTER
Filed Nov. 21, 1925
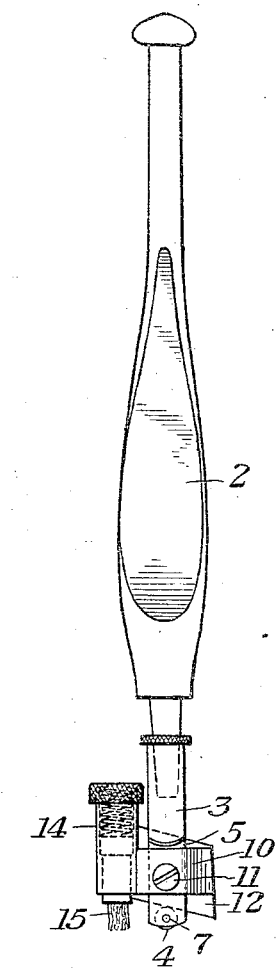
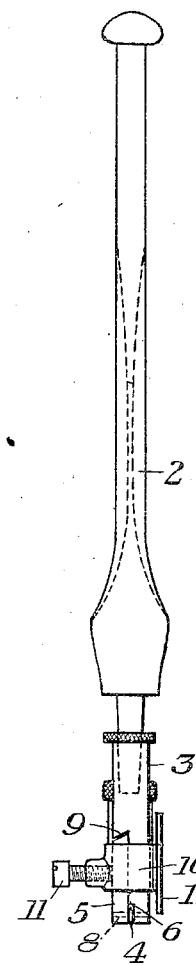
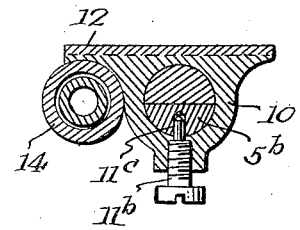
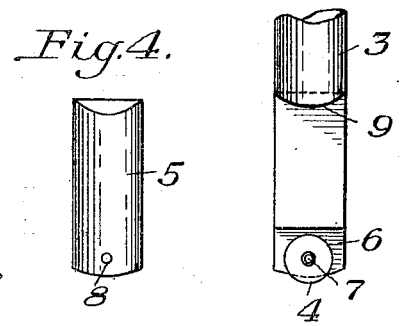
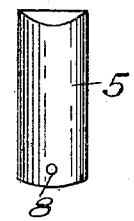
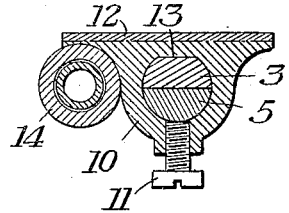
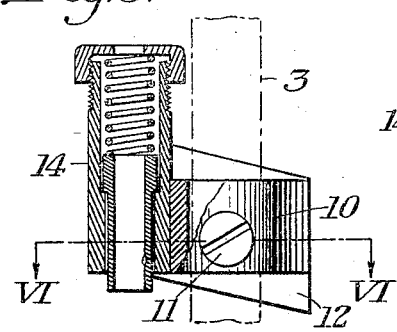
INVENTORS
Charles W. Kurtz
Edward J. Stein
John W. Crolley
by their attorneys
Byrnes, Stebbins & Parmelee.

Patented Nov. 16, 1926.

1,606,802

UNITED STATES PATENT OFFICE.

CHARLES W. KURTZ, OF PITTSBURGH, AND EDWARD J. STEIN AND JOHN W. CROLLEY, OF ARNOLD, PENNSYLVANIA, ASSIGNORS TO WINDOW GLASS MACHINE COMPANY, OF PITTSBURGH, PENNSYLVANIA, A CORPORATION OF NEW JERSEY.

GLASS CUTTER.

Application filed November 21, 1925. Serial No. 70,541.

This invention relates to glass cutters, and particularly to glass cutters of the wheel type, as opposed to cutters of the diamond type ordinarily used by professional cutters in the manufacture of window glass.

Skilled glass cutters have been accustomed for many years to use a diamond, and, in fact, so many cutters are accustomed to the "feel" of a diamond cutting tool in their hands that they refuse to use a wheel type of cutter.

Our experiments have shown that a skilled cutter using a proper wheel tool can cut considerably more glass than when working with a diamond.

In order to make a tool which is acceptable to the glass cutting trade, it is necessary to provide a tool which will resemble the diamond cutting tool in every respect. It is also necessary to provide for replacing the cutting wheel when it wears out. Unless these conditions are complied with, it is impossible to get professional cutters to use a wheel, in spite of the fact that a wheel is considerably cheaper, and new wheels may be used at short intervals without the material expense which is incident to the use and renewal of diamond points.

Diamond points are ordinarily mounted for glass cutting in the end of a small rod-like holder terminating in a ferrule. The holder is bored at one end to accommodate a wooden handle and a guide is clamped onto the holder.

We provide a glass cutter comprising a holder approximately the size and shape of the holder used for a diamond cutter, a wheel mounted in the holder and a guide having a clamping action with the holder by which the wheel is maintained in the holder.

Preferably the holder is split into two parts, one of these parts having an upstanding pin upon which the wheel is mounted. The other part when put in place covers the free end of the pin and holds the wheel in place, and the combined guide and clamp fits over the two parts and secures all of them.

Further means is provided for insuring that the guide will always present a guiding face which is parallel to the plane of the cutting wheel, thus insuring a smooth clean cut.

In the accompanying drawings, illustrating the present preferred embodiment of our invention:

Figure 1 is a side elevation of a cutter embodying our invention;

Figure 2 is a front elevation thereof;

Figure 3 is a view to enlarged scale of the holder, showing a cutting wheel mounted thereon;

Figure 4 is a similar view, showing the removable part of the holder;

Figure 5 is a side elevation, partly broken away, showing the manner of mounting a lubricator on the combined guide and clamp;

Figure 6 is a section on the line VI—VI of Figure 5; and

Figure 7 is a section similar to that shown in Figure 6, but illustrating a modified form of construction.

In the illustrated embodiment of the invention there is shown a glass cutter comprising a handle 2 and a holder 3 in which is mounted a cutting wheel 4. The holder or body 3 is of the same shape and size as the holder generally used for mounting a glass cutting diamond and terminates in the ordinary ferrule 4.

The lower portion of the holder has a cut-away portion at its lower end into which is fitted a segment 5, as best shown in Figure 2. When this segment is in place, the holder presents a smooth cylindrical form from end to end with the wheel carried in a small slot 6 at the bottom thereof.

The cutting wheel 4 is mounted on a pin 7 which projects outwardly from the body 3. The segment 5 is provided with a hole 8 for engaging the free end of this pin. When the cutter is to be put into use, a wheel is placed on the pin and the pin 7 is fitted into the hole 8 of the segment 5. The segment 5 is then swung around until it is in alignment with the body 3. The body is provided with an undercut 9 and the segment is correspondingly shaped so that it cannot be lifted directly off the pin but must be swung to one side before the wheel can be removed. This is desirable in that it prevents accidental misplacement of the parts or loss of the small wheels while a change is being made.

In order to hold the segment 5 in place, a clamp 10 is provided. This clamp comprises a ring surrounding the body 3 and the segment 5 and is provided with a set screw 11 which presses against the segment 5 and holds the parts firmly in place.

A guide 12 is formed on the clamp ring 12 so that the cutting wheel may be properly aligned with the direction of cutting. If the wheel is so placed that its axis is not perpendicular to the line of cut, a ragged and irregular cut is secured instead of a smooth and clean cut, and the wear of the wheel is very rapid.

In order to properly align the guide 12 with the cutting wheel, one side of the body 3 is preferably planed off perpendicular to the pin 7, as indicated at 13 in Figure 6. The clamping ring is shaped with a corresponding portion and the clamping ring will, therefore, always assume such position that the guide is parallel to the axis of the wheel. Other expedients for properly aligning the wheel and the guide may be employed, as, for example, in Figure 7 a countersunk opening is provided in the segment 5<sup>b</sup> and the screw 11<sup>b</sup> is provided with a point 11<sup>c</sup> to fit into this countersink.

The clamping ring also carries a lubricator indicated generally by the reference character 14. This lubricator is provided with a wick 15, and kerosene oil or other cutting lubricant may be supplied in the well thereabove. The wick leaves a streak ahead of the cutter and not only facilitates the cutting operation, but also materially prolongs the life of the cutting wheel.

Actual tests with our glass cutter show that materially improved results over those attained by a diamond may be had and that the tool is of particular value to professional glass cutters who are familiar with the ordinary diamond tool. Because of the resemblance of our cutting tool to the ordinary diamond cutter the workman has no difficulty in changing from one to the other. The cutting wheel is very readily changed and the entire device is simple, compact and relatively inexpensive. The fact that the holder or body is of generally cylindrical form permits of adjustment of the guide up and down the body as may be desired by individual cutters without in any way disturbing the clamping action. The length of the wick 15 may be readily changed to suit.

While we have illustrated a preferred embodiment of the invention, it will be understood that it is not thus limited, but may be otherwise embodied within the scope of the following claims:—

We claim:

1. A glass cutter comprising a holder, a cutting wheel, and a clamp arranged to maintain the wheel in the holder, the clamp having a guide thereon, substantially as described.

2. A glass cutter comprising a holder, a cut-away portion adapted to accommodate a cutting wheel, a piece adapted to fit in the cut-away portion of the holder and maintain the wheel in place, and a collar surrounding the holder and said piece for maintaining them in proper relation with one another, the collar having a clamping screw therein, substantially as described.

3. A glass cutter comprising a holder, a cut-away portion adapted to accommodate a cutting wheel, a piece adapted to fit in the cut-away portion of the holder and maintain the wheel in place, and a clamp for holding the last mentioned member in place, the clamp having a guide thereon, substantially as described.

4. A glass cutter comprising a holder, a pin projecting from the holder, a cutting wheel on the pin, a member adapted to engage the free end of the pin and to contact with the holder to hold the wheel in place, a collar surrounding the holder and the member to hold the two in proper relation with one another, and a clamping screw in the collar, substantially as described.

5. A glass cutter comprising a holder, a pin projecting from the holder, a cutting wheel on the pin, a member adapted to engage the free end of the pin and to contact with the holder to hold the wheel in place, and clamping means adapted to hold the member in place, the holder having means preventing direct removal of the member but requiring rotation thereof about the pin for removal, substantially as described.

6. A glass cutter comprising a two-part holder, said parts being adapted to be put together to form a generally cylindrical body, means for holding a cutter between the two parts, and a clamping ring adapted to hold the parts in suitable relation to one another, the clamp being adjustable to different positions along the body, substantially as described.

7. A glass cutter comprising a two-part holder, said parts being adapted to be put together to form a generally cylindrical body, means for holding a cutter between the two parts, a clamping ring adapted to hold the parts in suitable relation to one another, the clamp being adjustable to different positions along the body, and a lubricator mounted on said guide, substantially as described.

8. A glass cutter comprising a holder, a cutting wheel, a clamp arranged to maintain the wheel on the holder, the clamp having a guide, and means for insuring suitable alignment of the guide and the cutting wheel, substantially as described.

In testimony whereof we have set our hands.

CHARLES W. KURTZ.
EDWARD J. STEIN.
JOHN W. CROLLEY.